United States Patent [19]
Bateman

[11] Patent Number: 5,196,847
[45] Date of Patent: Mar. 23, 1993

[54] GROUND PROXIMITY WARNING INSTRUMENT USING FLIGHT PATH MODULATION OF GLIDE SLOPE ALERTING FUNCTION

[75] Inventor: Charles D. Bateman, Bellevue, Wash.
[73] Assignee: Sundstrand Corporation, Rockford, Ill.
[21] Appl. No.: 761,537
[22] Filed: Sep. 18, 1991
[51] Int. Cl.$^5$ ............................................. G08B 23/00
[52] U.S. Cl. .................................... 340/970; 340/963; 340/967; 342/65; 364/433
[58] Field of Search ............... 340/963, 964, 967, 968, 340/970; 342/65; 364/433, 434; 73/178 T; 244/180, 181

[56] References Cited

U.S. PATENT DOCUMENTS

| | | |
|---|---|---|
| 3,925,751 | 12/1975 | Bateman . |
| 3,988,713 | 10/1976 | Bateman . |
| 4,060,793 | 11/1977 | Bateman ............................ 340/964 |
| 4,684,948 | 8/1987 | Bateman ............................ 340/970 |
| 4,947,164 | 8/1990 | Bateman ............................ 340/963 |
| 5,038,141 | 8/1991 | Grove ............................... 340/970 |

FOREIGN PATENT DOCUMENTS

8701356 3/1987 World Int. Prop. O. .......... 340/963

Primary Examiner—Jin F. Ng
Assistant Examiner—Brent A. Swarthout
Attorney, Agent, or Firm—Fitch, Even, Tabin & Flannery

[57] ABSTRACT

A ground proximity warning system monitors the flight path angle or barometric or inertially derived descent rate of the aircraft and modulates the glide slope alerting function in accordance with flight path angle or descent rate when the aircraft is not descending rapidly even though it is below the glide slope in order to reduce nuisance warnings without compromising system sensitivity. Alternatively, the repetition rate of the alert may be varied as a function of the flight path angle or descent rate to provide less frequent alerts when the aircraft is not descending rapidly.

11 Claims, 1 Drawing Sheet

GROUND PROXIMITY WARNING INSTRUMENT USING FLIGHT PATH MODULATION OF GLIDE SLOPE ALERTING FUNCTION

BACKGROUND OF THE INVENTION

1. Field of the Invention

This invention relates generally to ground proximity warning systems, and to systems that modulate the warning envelope of the system in accordance with various parameters to reduce nuisance warnings without sacrificing sensitivity. In particular, the system according to the invention relates to modulating a below glide slope alerting envelope to permit the aircraft to fly below the glide slope under flight conditions where the aircraft is not descending too steeply, for example, during level or climbing flight conditions and even certain shallow descents. Alternatively, the repetition rate of the glide slope alert may be varied to reduce the frequency of the alert during level or ascending flight to provide the pilot an indication of the urgency of the alert.

2. Description of the Prior Art

A system that modulates an excessive descent rate envelope as a function of glide slope deviation is disclosed in U.S. patent application Ser. No. 07/666,094, filed on Mar. 7, 1991; however, the above-mentioned application does not disclose the modulation of a below glide slope warning envelope as a function of flight path of the aircraft as is contemplated by the present invention.

Systems that vary the repetition rate of an alert or a warning are also known. For example, a system disclosed in U.S. Pat. No. 3,925,751 discloses a variable rate advisory warning generator that varies the rate of the advisory warning as a function of the deviation of the aircraft below the glide slope, with the repetition rate being increased as the deviation below the glide slope increases. However, there is no suggestion of varying the repetition rate of the below glide slope alert as a function of the flight path of the aircraft.

SUMMARY

It is an object of the present invention to provide a below glide slope alerting system that overcomes many of the disadvantages of the prior art below glide slope alerting systems.

It is another object of the present invention to provide a below glide slope alerting system that generates fewer nuisance warnings than the prior art systems without reducing the sensitivity of the system when a condition requiring an alert is indicated.

It is another object of the present invention to provide a below glide slope alerting system wherein the criteria for generating the alert are modified as a function of the flight path of the aircraft.

It is another object of the present invention to provide a below glide slope alerting system wherein the below glide slope warning criteria are modified as a function of flight path angle or vertical velocity as determined inertially or from a barometric descent rate signal.

It is another object of the present invention to provide a below glide slope warning system wherein the repetition rate of the below glide slope alert is varied as a function of flight path as determined from the flight path angle or from inertially or barometrically derived vertical velocity.

It is another object of the present invention to vary the repetition rate of the below glide slope alert as a function of the ascent or descent of the aircraft to provide the pilot with an indication of the relative urgency of the alert.

Thus, in accordance with a preferred embodiment of the invention, the envelope of the warning criteria required to produce a below glide slope alert is varied as a function of flight path angle or vertical velocity in order to desensitize the system during ascending or level flight and gradually to increase the sensitivity for increasing angles of descent. This may be accomplished, for example, by varying the amplitude of the glide slope deviation applied to the system as a function of flight path angle or descent rate to reduce the amplitude of the glide slope signal applied to the system during level or ascending flight to thereby desensitize the system under such conditions.

In accordance with an alternative embodiment of the present invention, the repetition rate of the below glide slope alert may be altered as a function of flight path angle or vertical velocity so that the repetition rate is reduced during level or ascending flight to indicate to the pilot that the alert is not urgent. The time between alerts may even be made long enough that no alert at all is generated.

BRIEF DESCRIPTION OF THE DRAWING

These and other objects and advantages of the present invention will become readily apparent upon consideration of the following detailed description and attached drawing, wherein.

DETAILED DESCRIPTION OF THE PREFERRED EMBODIMENT

Figures 1, 2, 3, 4:
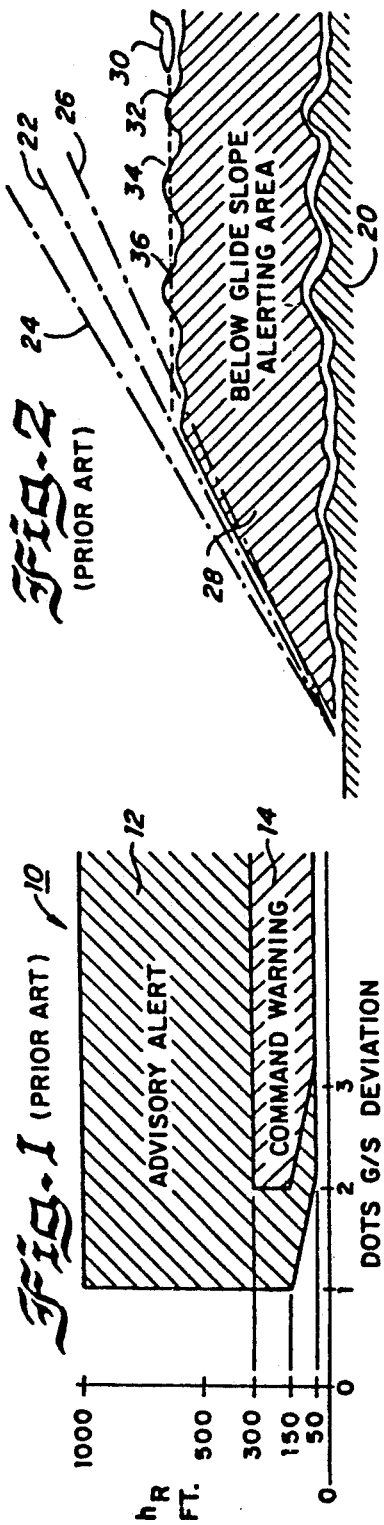
FIG. 1 is a graph illustrating the below glide slope alert and warning envelopes utilized by prior art below glide slope warning systems.
FIG. 2 illustrates the below glide slope alerting area above terrain produced by the warning envelope of FIG. 1.
FIG. 3 is a block diagram of the below glide slope alerting system according to the invention, wherein the below glide slope alerting envelope is modified as a function of the flight path of the aircraft.
FIG. 4 is a block diagram of the below glide slope alerting system according to the invention, wherein the repetition rate of the warning is varied as a function of the flight path of the aircraft.

Referring now to FIG. 1, there is shown a typical below glide slope warning envelope utilized in below glide slope warning systems used in commercial aircraft. As is shown in FIG. 1, the envelope has an advisory alert portion 12 that causes an alert to be generated when the aircraft descends below 1000 feet and the glide slope deviation exceeds 1 dot of deviation below the glide slope. To reduce nuisance warnings, the glide slope deviation required to generate a warning is gradually increased to 2 dots between altitudes of 150 and 50 feet. A second command warning area generates a warning that must be acted on by the pilot if the aircraft is below 300 feet and if the glide slope deviation exceeds 2 dots below the glide slope.

FIG. 2 illustrates the below glide slope alerting area that would be provided over terrain by the advisory alert envelope 12. FIG. 2 shows undulating terrain 20, a radio glide slope beam 22, and the 3 dot above and below deviation limits 24 and 26, respectively, about the glide slope 22. In addition, FIG. 2 shows the below glide slope alerting area that extends from 50 feet above the terrain 20 to 1000 feet above the terrain 20 and into an area that is 1 dot below the glide slope 22. In addition, FIG. 2 shows an aircraft 30 flying level at a nominal altitude of approximately 1000 feet above ground. Under such circumstances, a below glide slope alerting system carried aboard the aircraft would provide glide slope alerts at points 32, 34 and 36 where the flight path of the aircraft intersected the 1000 foot above ground level below glide slope alerting area. Such warnings would be nuisance warnings because even though the pilot was technically below the glide slope, he had not yet entered the glide slope control area and, in fact, was in level flight toward the glide slope beam. Radar vectoring at approximately 1000 feet above the field before entering the glide slope is not uncommon and, consequently, the glide slope warning area may be penetrated and nuisance warnings generated.

One way to avoid such nuisance warnings would be simply to reduce the upper limit on the below glide slope alerting area to less than 1000 feet above ground; however, such a reduction would delay a needed alert for a true inadvertent flight below the glide slope. Also, any improvement to reduce any unwanted alerts must also meet the U.S. government standard RTCA DO-161A "Minimum Performance Standards-Airborne Ground Proximity Warning Equipment" that are nominally illustrated in FIG. 1.

Referring now to FIG. 3, there is shown a block diagram of an improvement to a below glide slope warning system according to the invention that modifies the glide slope alerting envelope to avoid the nuisance warnings described above. The improvement according to the invention is discussed herein as being applied to a below glide slope warning system similar to the one described in U.S. Pat. No. 3,988,713, assigned to the same assignee as the assignee of the present invention, and incorporated herein by reference. However, it should be understood that the principles of the present invention can be used in conjunction with other below glide slope alerting systems.

The alerting system 40 receives signals representative of the altitude of the aircraft above ground from a radio altimeter 42. The signal $h_R$ from the radio altimeter is applied to a negative input of a summing junction 44 and is combined with a $-150$ foot reference signal to provide a negative polarity signal to a limiter 46 that is clamped at zero volts and 150 feet. The summing junction 44 and the limiter 46 cooperate to reduce the sensitivity of the alerting envelope between 150 and 50 feet shown in FIG. 2, and the operation of the summing junction 44 and the limiter 46 is discussed in detail in the aforementioned U.S. Pat. No. 3,988,713.

The output from the limiter 46 is applied to a scaling amplifier 48 and then to a summing junction 50. The summing junction 50 also receives glide slope deviation signals G/S from a glide slope receiver 52 via a scaling amplifier 54 whose function will be described in a subsequent portion of the specification.

The summing junction 50 compares the negative polarity signal from the amplifier 48 with the positive polarity signal from scaling amplifier 54 and provides an output representative of the deviation of the aircraft from the glide slope as modified by the radio altimeter signal below 150 feet. The output of the summing junction 50 is applied to a bistable device that goes to a high state when the deviation signal applied thereto indicates that the below glide slope deviation is in excess of 1.0 dots. The output from the bistable device 56 is applied to an AND gate 58 via an input line 60. The AND gate 58 also receives signals from various aircraft discretes via input lines 62, 64, 66 and 68. For example, in order to enable the AND gate 58, the landing gear must be down as evidenced by the presence of a gear down signal GD on the line 62, the aircraft must be between 50 and 1000 feet above ground as required by the warning envelope of FIG. 2 and as evidenced by the less than 1000 foot signal on the line 64 and the greater than 50 foot signal on line 66, and the glide slope signal must be valid as indicated by the G/S valid signal on line 68. With these conditions being met, the AND gate 58 will provide an output signal to a voice warning generator 70 whenever the deviation below the glide slope exceeds 1.0 dots. The operation of components analogous to the summing junction 50, the bistable device 56 and the AND gate 58 are discussed in the aforementioned U.S. Pat. No. 3,988,713.

The output of the AND gate 58 is applied to a voice generator 70 that causes the voice generator 70 to generate an appropriate alert, such as, for example, "GLIDE SLOPE" at periodic intervals. The voice alert from the voice generator 70 is then applied to an appropriate transducer 72 or to the cockpit communication system (not shown) so that the alert may be heard by the pilot.

In accordance with an important aspect of the present invention, in order to reduce or eliminate the nuisance alerts referred to earlier in the specification, the gain of the scaling amplifier 54 is varied as a function of the flight path of the aircraft.

Various signals may be utilized to define the flight path of the aircraft, and in the embodiment illustrated in FIG. 3, flight path angle $\gamma$ is utilized. The flight path angle $\gamma$ is determined in the illustrated embodiment from a vertical velocity signal obtained from a vertical velocity signal source 74 and from a true airspeed signal obtained from a true airspeed signal source 76. The vertical velocity signal from the vertical velocity signal source 74 may be derived barometrically as a barometric rate signal or inertially from an inertial navigation system. The true airspeed may be derived, for example, from an air data computer or from an airspeed indicator corrected for temperature and altitude.

The vertical velocity signal from the vertical velocity signal source 74 is divided by the airspeed signal from the airspeed signal source 76 by a divider 78 to provide the flight path angle $\gamma$ which is utilized to control the gain constant K of the variable gain amplifier 54. For example, if the flight path angle $\gamma$ is a descent angle of 2.5° or more, the gain of the amplifier is set to full gain, with the gain constant K being equal to 1 to provide full sensitivity for the system. When the flight path angle is equal to or greater than 0 indicating level flight or a climb, the value of K is reduced to 0, thus effectively inhibiting the generation of a below glide slope warning. For values of flight path angle $\gamma$ between 0° and 2.5° of descent, the value of the gain constant K is linearly increased from 0 at level flight to 1 at a flight path angle of 2.5° descent.

Vertical velocity may also be used as an indication of flight path. In such an instance, the airspeed signal source 76 and the divider 78 would be eliminated and the vertical velocity signal from the vertical velocity signal source 74 would be applied directly to the variable gain scaling amplifier 54. In such a case, if the vertical velocity were 0 or positive, indicating level flight or a climb, the gain constant K would be reduced to 0. Similarly, if the vertical velocity were negative, for example, −500 feet per minute or greater, the value of the gain constant K would be increased to 1. Between zero and −500 feet per minute, the gain constant would be linearly increased from 0 to 1.

Referring now to FIG. 4, there is shown a system that varies the repetition rate of the voice warning as a function of aircraft flight path. FIG. 4 is similar to a system disclosed in U.S. Pat. No. 3,925,751, assigned to the same assignee as the assignee of the present invention, and incorporated herein by reference. The system of FIG. 4 utilizes a warning signal generator 80 that receives radio altimeter signals $h_R$ from a radio altimeter, such as the radio altimeter 42 of FIG. 3, and a glide slope deviation signal G/S from a glide slope deviation receiver, such as the glide slope receiver 52 of FIG. 3. and compares the radio altitude and glide slope signals to generate either a command warning or an advisory alert in accordance with the criteria of FIG. 1. The operation of the warning signal generator 80 is discussed in greater detail in U.S. Pat. No. 3,925,751.

The system also includes a voice generator 70′ similar to the voice generator 70 except that the voice generator 70′ contains two separate and distinct warnings that serve as the command warning and the advisory alert. For example, the advisory warning may be simply "GLIDE SLOPE" as in the case of the voice generator 70 and the command warning may be a more urgent warning such as "GLIDE SLOPE, PULL UP". The "GLIDE SLOPE, PULL UP" warning is triggered by the warning signal generator 80 that applies a command warning trigger signal to a line 82 to initiate the command warning whenever the command warning envelope (FIG. 1) is penetrated. The advisory alert signal enables a variable rate control circuit 86 via a line 84 whenever the advisory alert boundary 12 is penetrated. Whenever the alert boundary 12 is penetrated, the variable rate control circuit 86 receives the enabling signal appearing on the line 84 and applies periodic trigger signals to the voice warning generator 70′ to cause the voice warning generator to generate the advisory alert. The appropriate output of the voice generator 70′ is then applied to a transducer such as the transducer 72′. The operation of the variable rate control circuit is described in greater detail in U.S. Pat. No. 3,925,751.

In accordance with another important aspect of the invention, the variable rate control circuit 86 is controlled by either the flight path angle signal from the divider 78 (FIG. 3) or by the vertical velocity signal received from the vertical velocity signal source 74. Thus, if the aircraft is in level flight indicating a positive flight path angle or vertical velocity, the pause between voice warnings can be made very long and even approach infinity, so that under level flight or ascending flight conditions, the voice warning generator 70′ is essentially inhibited. For descending flight conditions corresponding to a flight path angle of −2.5° or greater or a vertical velocity of −500 feet per minute or greater, the pause between voice alerts would be a normal pause, for example, 1-2 seconds. Between −2.5° and 0° of flight path angle, or between −500 feet per minute and zero feet per minute vertical velocity, the length of the pause would increase exponentially between 1-2 seconds and infinity.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A glide slope warning system for aircraft responsive to a signal representative of the deviation of an aircraft from a glide slope radio beam and to a signal representative of the flight path of the aircraft, comprising:

means responsive to said glide slope deviation signal for generating a glide slope alert when the aircraft descends below the glide slope by a predetermined amount according to a predetermined set of criteria; and means for reducing nuisance warnings, including means responsive to said flight path representative signal for altering said predetermined set of criteria as a function of the flight path of the aircraft to increase said predetermined amount when the aircraft is descending at less than a predetermined rate.

2. A glide slope warning system for aircraft responsive to a signal representative of the deviation of an aircraft from a glide slope radio beam and to a signal representative of the flight path of the aircraft, comprising:

means responsive to said glide slope deviation signal for generating a glide slope alert when the aircraft descends below the glide slope by a predetermined amount according to a predetermined set of criteria; and means responsive to said flight path representative signal for altering said predetermined criteria as a function of the flight path of the aircraft, said system including means for inhibiting said alert when the aircraft is not descending.

3. A glide slope warning system as recited in claim 1, wherein said flight path representative signal is a flight path angle representative signal.

4. A glide slope warning system as recited in claim 1, wherein said flight path representative signal is a vertical velocity signal.

5. A glide slope warning system for aircraft responsive to a signal representative of the deviation of an aircraft from a glide slope radio beam and to a signal representative of the flight path of the aircraft, comprising:

means responsive to said glide slope deviation signal for generating a periodic glide slope alert at a predetermined repetition rate when the aircraft descends below the glide slope by a predetermined amount; and means for reducing nuisance warnings, including means responsive to said flight path representative signal for altering said predetermined repetition rate as a function of the flight path of the aircraft, said nuisance warning reducing means including means for reducing said predetermined repetition rate when the aircraft is descending at less than a predetermined rate.

6. A glide slope warning system as recited in claim 5, wherein said repetition rate is relatively greater when the aircraft is descending than when it is not descending.

7. A glide slope warning system for aircraft responsive to a signal representative of the deviation of an aircraft from a glide slope radio beam and to a signal representative of the flight path of the aircraft, comprising:
 means responsive to said glide slope deviation signal for generating a periodic glide slope alert at a predetermined repetition rate when the aircraft descends below the glide slope by a predetermined amount; and
 means responsive to said flight path representative signal for altering said predetermined repetition rate as a function of the flight path of the aircraft, wherein said repetition rate is relatively greater when the aircraft is descending than when it is not descending, said system including means for inhibiting said alert when the aircraft is not descending.

8. A glide slope warning system as recited in claim 6, wherein said flight path representative signal is a flight path angle representative signal.

9. A glide slope warning system as recited in claim 6, wherein said flight path representative signal is a vertical velocity signal.

10. A glide slope warning system as recited in claim 1, wherein said altering means includes means for gradually increasing said predetermined amount in response to reduced descent rates.

11. A glide slope warning system as recited in claim 5, wherein said altering means includes means for gradually reducing said repetition rate in response to reduced descent rates.

* * * * *